US010135483B2

(12) United States Patent
Margomenos (10) Patent No.: US 10,135,483 B2
(45) Date of Patent: Nov. 20, 2018

(54) TRANSMITTER/RECEIVER MODULE FOR MILLIMETER WAVE 5G MIMO COMMUNICATION SYSTEMS

(71) Applicant: Infineon Technologies AG, Neubiberg (DE)

(72) Inventor: Alexandros Margomenos, San Jose, CA (US)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 15/829,000

(22) Filed: Dec. 1, 2017

(65) Prior Publication Data
US 2018/0145718 A1 May 24, 2018

Related U.S. Application Data

(62) Division of application No. 15/359,685, filed on Nov. 23, 2016, now Pat. No. 9,866,259.

(51) Int. Cl.
*H04B 1/04* (2006.01)
*H04B 1/40* (2015.01)
*H04B 7/0413* (2017.01)

(52) U.S. Cl.
CPC .......... *H04B 1/40* (2013.01); *H04B 7/0413* (2013.01); *H05K 999/99* (2013.01)

(58) Field of Classification Search
CPC ........ H04B 1/40; H04B 1/44; H04B 1/72519; H04B 7/0413; H04B 10/40; H04B 17/00; H04B 17/11; H04B 17/101
USPC ....... 455/78.84, 115.1, 117, 127.2, 217, 333, 455/423, 425
See application file for complete search history.

(56) References Cited

U.S. PATENT DOCUMENTS

| 4,635,062 A | 1/1987 | Bierig et al. |
| 4,724,441 A | 2/1988 | Fithian et al. |
| 5,559,519 A | 9/1996 | Fenner |

(Continued)

OTHER PUBLICATIONS

Unknown, Author, "GaN HEMT Biasing Circuit with Temperature Compensation", CREE, Application Note, AppNote-011 Rev. B, 2012, pp. 1-2.

(Continued)

*Primary Examiner* — Quochien B Vuong
(74) *Attorney, Agent, or Firm* — Murphy, Bilak & Homiller, PLLC (57) ABSTRACT

A transmit/receive module includes an integrated control circuit. The integrated control circuit includes an RFIC input terminal, multiple pairs of I/O terminals, a power splitter/combiner having an input connected to the RFIC input terminal, a plurality of phase shifters connected between outputs of the power splitter/combiner and the I/O terminals, and a power sensor connected to each one of the I/O terminals. The integrated control circuit further includes a plurality of transmit/receive integrated circuits that each include a TX input terminal, an RX output terminal, an antenna interface terminal, a power amplifier connected, a low noise, and a switch connected between the power amplifier, the low noise amplifier and the antenna interface terminal. Gate and drain terminals of a final stage of each power amplifier of the transmit/receive integrated circuits are independently connected to and controllable by the integrated control circuit.

4 Claims, 12 Drawing Sheets

(56) References Cited

U.S. PATENT DOCUMENTS

| | | | |
|---|---|---|---|
| 7,071,873 B2 * | 7/2006 | Tomasic | H01Q 3/28 |
| | | | 342/372 |
| 7,620,371 B2 | 11/2009 | Zolfaghari | |
| 8,412,290 B2 | 4/2013 | Shamim et al. | |
| 8,472,887 B2 * | 6/2013 | Penn | H04B 1/40 |
| | | | 455/73 |
| 8,618,983 B2 | 12/2013 | Chen et al. | |
| 8,970,427 B2 | 3/2015 | Liang et al. | |
| 9,160,284 B2 | 10/2015 | Matsumoto et al. | |
| 9,325,281 B2 | 4/2016 | Levesque et al. | |
| 2015/0276919 A1 * | 10/2015 | Matsumura | H01Q 3/267 |
| | | | 342/175 |

OTHER PUBLICATIONS

Bellantoni, John, "Bias Techniques for GaN and pHEMT Depletion Mode Devices", TriQuint, www.triquint.com, Eng. Rev 3, Jul. 24, 2014.

Curtis, Jeffery et al., "A Fully Integrated Ka-Band Front End for 5G Transceiver", 2016 IEEE MTT-S International Microwave Symposium (IMS), May 2016, pp. 1-3.

Roh, Wonil et al., "Millimeter-Wave Beamforming as an Enabling Technology for 5G Cellular Communications: Theoretical Feasibility and Prototype Results", IEEE Communications Magazine, vol. 52, Issue 2, Feb. 19, 2014, pp. 106-113.

Sun, Shu et al., "MIMO for Millimeter-Wave Wireless Communications: Beamforming, Spatial Multiplexing, or Both?", IEEE Communications Magazine, vol. 52, Issue 12, Dec. 11, 2014, pp. 110-121.

* cited by examiner

TRANSMITTER/RECEIVER MODULE FOR MILLIMETER WAVE 5G MIMO COMMUNICATION SYSTEMS

PRIORITY CLAIM

This application is a Divisional of U.S. application Ser. No. 15/359,685 filed on Nov. 23, 2016, the content of which is incorporated herein by reference in its entirety.

TECHNICAL FIELD

The instant application generally relates to communication systems, and more particularly relates to 5G phased array transmit/receive modules.

BACKGROUND

Fifth generation (5G) wireless refers to a proposed telecommunications standard that is set to replace the current fourth generation (4G) telecommunications standard. 5G aims to offer improved network capability including faster download speeds, greater bandwidth, spectral efficiency, lower latency, etc. The 5G standard will use a high frequency/short wavelength frequency spectrum, e.g., in the range of 20 GHz-60 GHz, which corresponds to wavelengths in the range of 5 mm-15 mm. These short wavelengths present unique design challenges with respect to the base station equipment that is used to transmit and receive the RF signals.

Phased antenna arrays generally refer to communication systems that use a plurality of antennas (two or more) and phase shifting to transmit and receive RF signals. Phased antenna arrays offer numerous advantages over single antenna systems, such as high gain, directional steerability, and simultaneous communication. Currently, there are no commercially available 5G mmW (millimeter wavelength) phased antenna array systems. One notable design challenge with respect to 5G mmW phased antenna array systems is that the spacing between antenna elements must be correlated to the wavelength of the RF signal, typically ½ of the wavelength. In the case of 5G systems, this means that the antennas must be spaced apart from one another in the range of 2 mm 7 mm, which places a premium on space efficiency. To this end, amplifier devices that can operate at very high frequencies and offer a small footprint are preferred. One amplifier device that is able to operate at very high frequencies and has a small footprint is a III-V semiconductor device, such as a GaN (gallium arsenide) based HEMT (high-electron-mobility Field Effect Transistor) amplifier device. III-V semiconductor devices are typically normally-on devices. That is, these devices have a self-conducting channel that is present without any gate bias. Therefore, these normally-on devices must be controlled by circuitry that is capable of generating negative voltages to turn the device off. In the context of 5G mmW (millimeter wavelength) phased antenna array systems, GaN based HEMT devices, while promising, introduce unique and currently unsolved challenges with respect to gate biasing, compensation for dynamic drain current effects, power back-off, etc.

SUMMARY

A transmit/receive module is disclosed. According to an embodiment, the transmit/receive module includes an integrated control circuit that is configured to operate in a transmit mode and in a receive mode. In the transmit mode, the integrated control circuit is configured to convert a digital input signal into a plurality of phase shifted RF transmit signals corresponding to a radiation pattern for a phased array. In the receive mode, the integrated control circuit is configured to convert an RF receive signal that is received from a phased array into a digital output signal. The transmit/receive module further includes a plurality of transmit/receive integrated circuits connected to and controlled by the integrated control circuit. Each of the transmit/receive integrated circuits are configured to amplify one of the RF transmit signals using a power amplifier during the transmit mode, and to amplify one of the RF receive signals using a low noise amplifier during the receive mode. The integrated control circuit is configured to bias the power amplifier of at least one of the transmit/receive integrated circuits and to calibrate a power level the power amplifier of at least one transmit/receive amplifier integrated circuits in the transmit mode. The integrated control circuit is configured to protect the integrated control circuit from damage by controlling the low noise amplifier of at least one transmit/receive amplifier integrated circuit during the receive mode.

According to another embodiment, the transmit/receive module includes an integrated control circuit. The integrated control circuit includes an RFIC input terminal, multiple pairs of I/O terminals, each pair including a TX output terminal and an RX input terminal, a power splitter/combiner having an input connected to the RFIC input terminal, a plurality of phase shifters connected between outputs of the power splitter/combiner and the I/O terminals, and a power sensor connected to each one of the I/O terminals. The transmit/receive module further includes a plurality of transmit/receive integrated circuits connected to the integrated control circuit. Each of the transmit/receive integrated circuits include a TX input terminal connected to the TX output terminal of one of the pairs of I/O terminals, an RX output terminal connected to the RX input terminal from the one of the pairs of I/O terminals, an antenna interface terminal, a power amplifier connected to the TX input terminal, a low noise amplifier connected to the RX output terminal, and a switch connected between the power amplifier, the low noise amplifier and the antenna interface terminal. Gate and drain terminals of a final stage of each power amplifier of the transmit/receive integrated circuits are independently connected to and controllable by the integrated control circuit.

A method of transmitting and receiving RF signals across a phased array using a transmit/receive module is disclosed. The transmit/receive module includes an integrated control circuit and a plurality of transmit/receive integrated circuits, each of the transmit/receive integrated circuits including a power amplifier and a low noise amplifier. According to an embodiment, the method includes operating the transmit/receive module in a transmit mode. The transmit mode includes converting a digital input signal into a plurality of phase shifted RF transmit signals corresponding to a radiation pattern for a phased array using the integrated control circuit, and amplifying each of the phase shifted RF transmit signals using the power amplifier in the transmit/receive integrated circuits. Amplifying each of the phase shifted RF transmit signals includes biasing the power amplifier of each transmit/receive integrated circuit and calibrating a power level of the power amplifier of each transmit/receive amplifier integrated circuit using the integrated control circuit. The method further includes operating the transmit/receive module in a receive mode. The receive mode includes amplifying one or more RF receive signals that are received from the phased array using the low noise amplifier in the transmit/receive integrated circuits, converting the RF receive signals into a digital output signal using the integrated control circuit, and protecting the integrated control circuit from damaging power levels of the RF receive signals by biasing the low noise amplifier in at least one of the transmit/receive integrated circuits using the integrated control circuit.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIG. 4, which includes

FIG. 5, which includes

FIG. 7, which includes

DETAILED DESCRIPTION

According to embodiments described herein, a transmit/receive module for 5G mmW phased array antenna systems and a corresponding method of operating the transmit/receive module is disclosed. The transmit/receive module combines a SiGe BiCMOS integrated control circuit with a plurality of GaN based amplifier transmit/receive integrated circuits, wherein one of the GaN based transmit/receive integrated circuits is associated with each antenna of the phased array. Signal distribution, phase shifting, signal amplification, power sensing, power calibration, temperature compensation, bias control and digital control occur on the SiGe BiCMOS integrated control circuit. Transmit/receive switching, high power signal amplification and receiver protection occur on the GaN based transmit/receive chip. This architecture offers the following three benefits that are not available in conventional designs: (1) biasing of the GaN power amplifier using the SiGe BiCMOS control chip, (2) calibration of the output power of the GaN power amplifier optimal efficiency and linearity using the SiGe BiCMOS control chip, and (3) protection of the receive circuitry on the SiGe BiCMOS control chip by controlling the GaN low noise amplifier.

Figure 1:
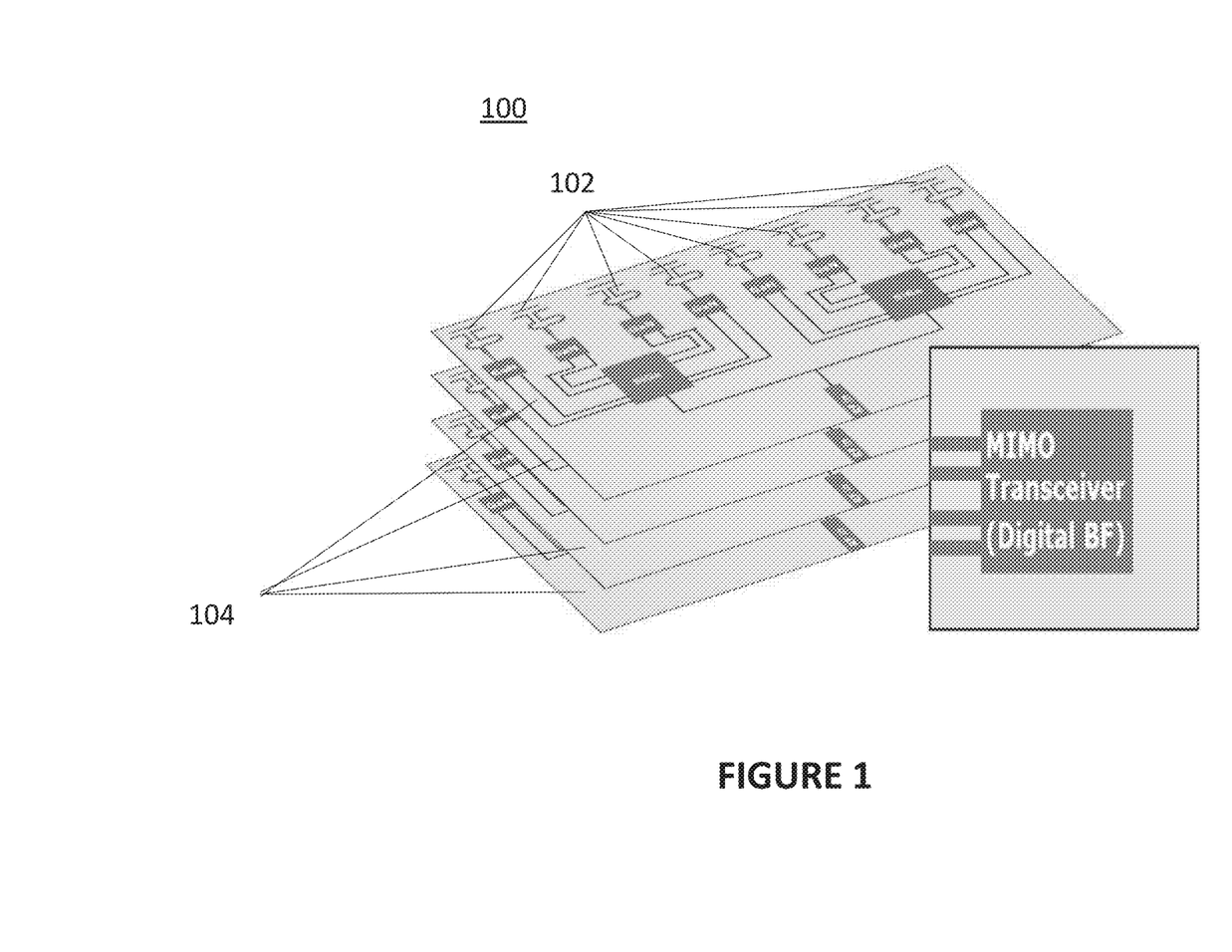
FIG. 1 illustrates a digital/analog hybrid 5G mmW RF front-end, according to an embodiment.

Referring to FIG. 1, an RF front-end 100 for 5G mmW systems is depicted, according to an embodiment. This is a Multiple-Input-Multiple-Output (MIMO) system where multiple RF signals can be pointed to multiple spatial locations depending on the digitally applied weights. The RF front-end has a hybrid digital/analog architecture, which uses N (N<<$N_x$×$N_z$) RF chains, each connected to $N_x$×$N_z$ antennas 102 with analog phase and amplitude weights. This topology partitions the antenna array into N subarrays each using analog beamforming. Digital processing is then used to combine the N subarrays and achieve MIMO operation. Compared to an analog architecture, the hybrid alternative offers MIMO functionality. Compared to digital beamforming, the hybrid architecture reduces the number of required RF chains and enables multiple data streams to be sent to different spatial directions. Such a hybrid RF front-end can be implemented with a brick phased array approach. In this example, four analog phased array tiles 104 are combined with a digital MIMO transceiver. Each analog phased array tile 104 has eight end-fire antennas 102, which are embodied as planar antennas in FIG. 1. Each antenna 102 has an analog phase and amplitude weight provided by the transmitter and receiver (T/R) chips and associated control circuit (GaN and SiGe BiCMOS). This topology forms a 4×8 hybrid array with analog beamsteering in elevation and digital in azimuth. This is one example, and different variations of this topology can be easily realized.

Figure 2:
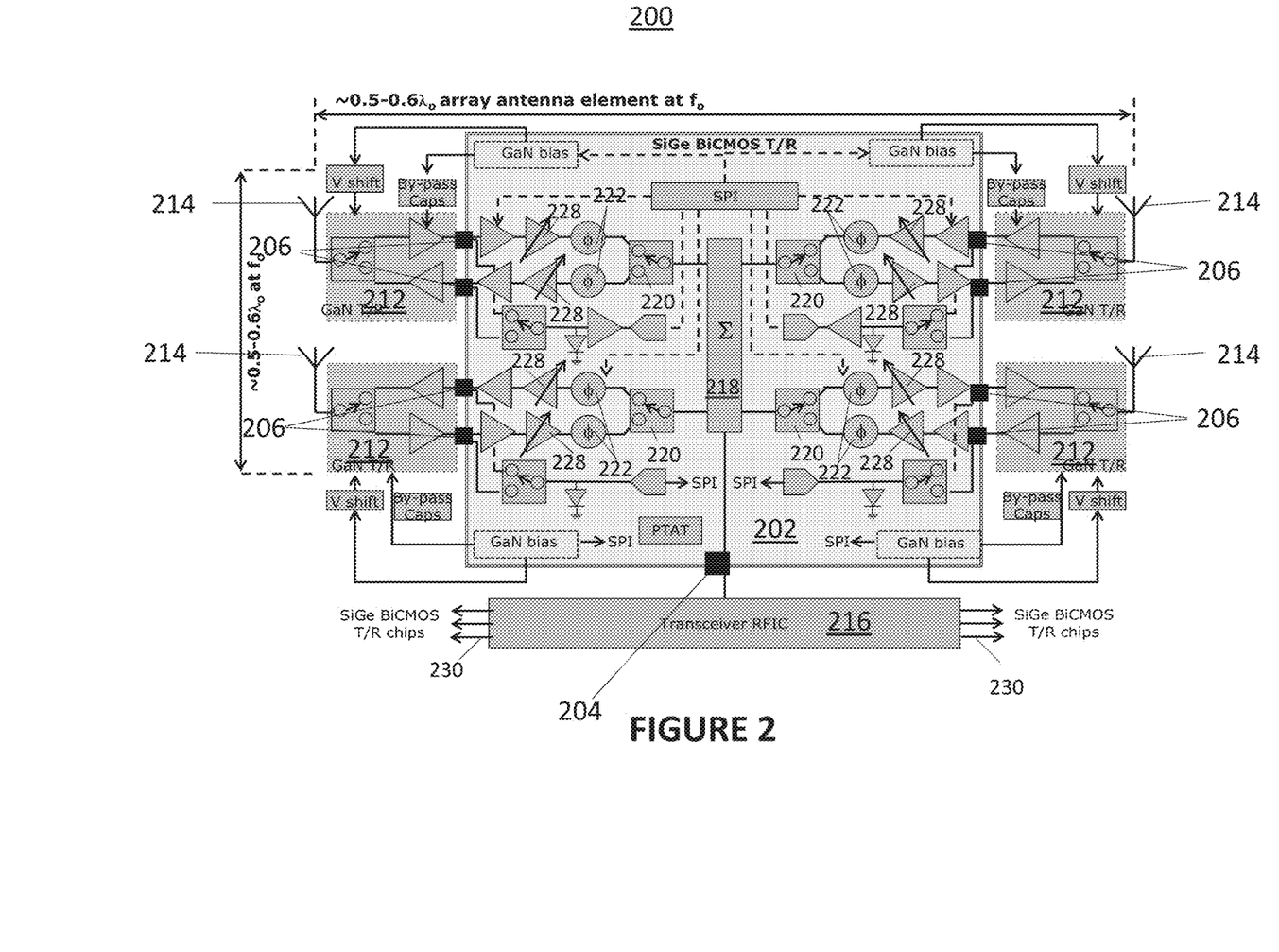
FIG. 2 illustrates an RF transmit/receive module, according to an embodiment.

Referring to FIG. 2, a transmit/receive module 200 is depicted, according to an embodiment. The transmit/receive module 200 can be incorporated into the RF front-end 100 described with reference to FIG. 1. The transmit/receive module 200 includes an integrated control circuit 202, which can be a SiGe (silicon germanium) BiCMOS chip. The integrated control circuit 202 includes an RFIC input terminal 204 and four pairs of I/O terminals 206. Each pair of the I/O terminals 206 includes a TX output terminal 208 (shown in FIG. 3) and an RX input terminal 210 (shown in FIG. 3). Each pair of the I/O terminals 206 are connected to transmit/receive integrated circuits 212. According to an embodiment, the transmit/receive integrated circuits 212 are GaN based integrated circuits. These GaN based integrated circuits may include one or more HEMT devices. In the depicted embodiment, the integrated control circuit 202 is a 4-channel control circuit. One of the transmit/receive integrated circuits 212 is provided for each channel. Alternatively, the integrated control circuit 202 can have more channels depending on the desired topology. Moreover, the four transmit/receive integrated circuits 212 that are provided as separate chips in the depicted embodiment can be combined in two or one chip depending on the final implementation.

Each one of the transmit/receive integrated circuits 212 are connected to an antenna element 214. The antenna elements 214 collectively form a phased array. The overall size and chip configuration of the transmit/receive module 200 is limited by the spacing between antenna elements 214 in the phased array. For typical communication arrays, which require ±45° scanning, a $0.6\lambda_o$ inter-element spacing is acceptable.

The transmit/receive module 200 is configured to operate in a transmit mode and a receive mode. In the transmit mode, a transceiver RFIC 216 (modem) is used to convert a digital input signal into an RF signal which is then fed into the RFIC input terminal 204 of the integrated control circuit 202. A 1:4 power splitter/combiner 218 is used to distribute the RF signal to the 4 output channels. The 1:4 power splitter/combiner 218 can be a passive or active power splitter/combiner. On each channel, a single-pole-double-throw (SPDT) switch 220 is used to separate the transmitter from the receiver function. A plurality of phase shifters 222 are connected between outputs of the power splitter/combiner 218 and the I/O terminals 206. During transmission, the RF signal passes through the phase shifter 222. The phase shifter 222 can be an active phase rotator, a passive switched line/true time delay, a reflective phase shifter, a loaded line phase shifter or a high-pass/low-pass phase shifter, according to various embodiments. The phase shifted RF transmit signals are fed through the TX output terminal 208 to the transmit/receive integrated circuits 212. The transmit/receive integrated circuits 212 amplify the phase shifted RF transmit signals using a power amplifier 224 (shown in FIG. 3), the details of which will be described in further detail below.

In the receive mode, one or more RF receive signals are received by the phased array and fed to the transmit/receive integrated circuit 212 associated with the respective antenna element 214. The transmit/receive integrated circuit 212 amplifies the RF receive signal using a low noise amplifier 226 (shown in FIG. 3), the details of which will be described in further detail below. The amplified RF receive signal is then fed to the integrated control circuit 202 via the RX input terminal 210. The amplified RF receive signal then passes through a VGA 228 (variable gain amplifier) and a phase shifter 222. The amplified RF receive signal is ultimately converted into a digital output signal. In both transmission and reception, the VGA 228 and the phase shifter 222 are used to provide the needed analog phase and amplitude weights on each channel. All the operation of the SiGe BiCMOS T/R chip and the GaN T/R chips is controlled through an SPI (serial peripheral interface) bus interface 230.

Figure 3:
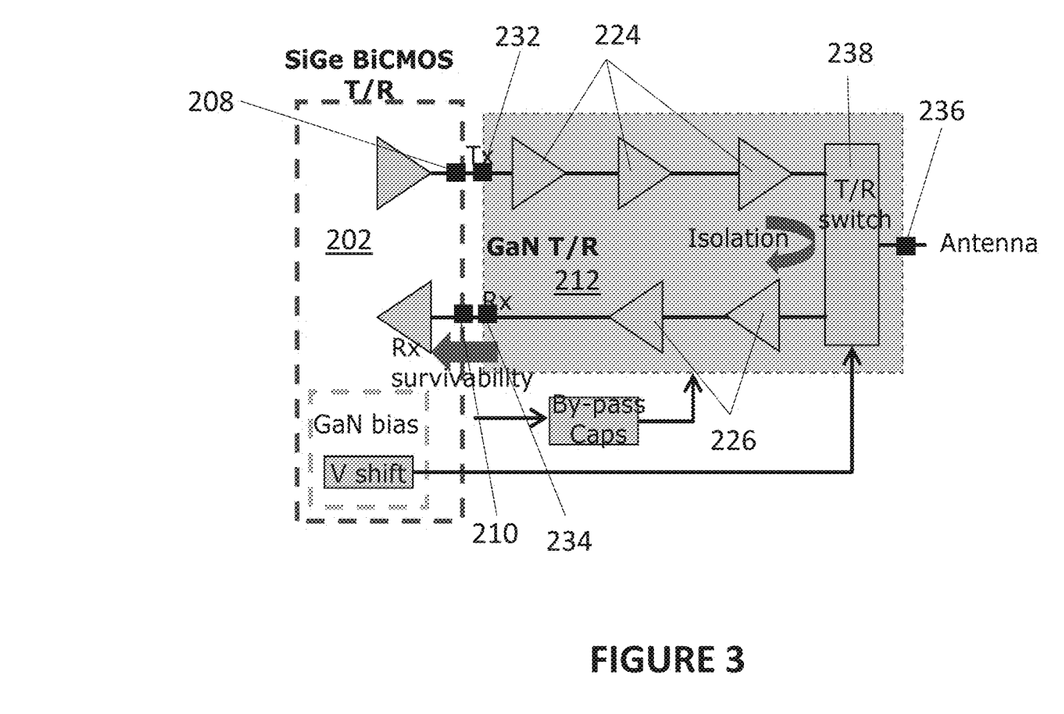
FIG. 3 illustrates a detailed schematic view of a GaN based transmit/receive integrated circuit, according to an embodiment.

Referring to FIG. 3, one of the transmit/receive integrated circuits 212 is depicted, according to an embodiment. The transmit/receive integrated circuit 212 includes a TX input terminal 232 that is externally connected to one of the TX output terminals 208 of the integrated control circuit 202, an RX output terminal 234 that is externally connected to one of the RX input terminals 210 of the integrated control circuit 202, and an antenna interface terminal 236 that is externally connected to one of the antenna elements 214 of the phased array. The transmit/receive integrated circuit 212 internally includes a power amplifier 224, a low noise amplifier 226, and a transmit/receive switch 238. The power amplifier 224 is connected to the TX input terminal 232. The low noise amplifier 226 is connected to the RX output terminal 234. The transmit/receive switch 238 is connected between the power amplifier 224, the low noise amplifier 226 and the antenna interface terminal 236. The transmit/receive switch 238 is used to switch between transmit mode and receive mode. During the transmit mode, the transmit/receive switch 238 connects an output of the power amplifier 224 to the antenna interface terminal 236 and disconnects the low noise amplifier 226 from the antenna interface terminal 236. At this time, an RF transmit signal that is applied to the TX input terminal 232 is amplified by the power amplifier 224 and fed to one of the antenna elements 214 via the transmit/receive switch 238. During the receive mode, the transmit/receive switch 238 connects the antenna interface terminal 236 to an input of the low noise amplifier 226 and disconnects the power amplifier 224 from the antenna interface terminal 236. At this time, an RF receive signal that is received by one of the antenna elements 214 is amplified by the low noise amplifier 226 and fed to the RX input terminal of the integrated control circuit 202, and may be then fed into a low noise amplifier 226 in the integrated control circuit 202.

The transmit/receive switch 238 requires a high control voltage (e.g., in the range of −10V to −15V) to survive voltage swings caused by transmitted RF powers up to 36 dBm. Depending on the specific SiGe BiCMOS technology used for the integrated control circuit 202, generating such negative voltages may require a voltage shifter network integrated into the integrated control circuit 202.

Figures 4A, 4B:
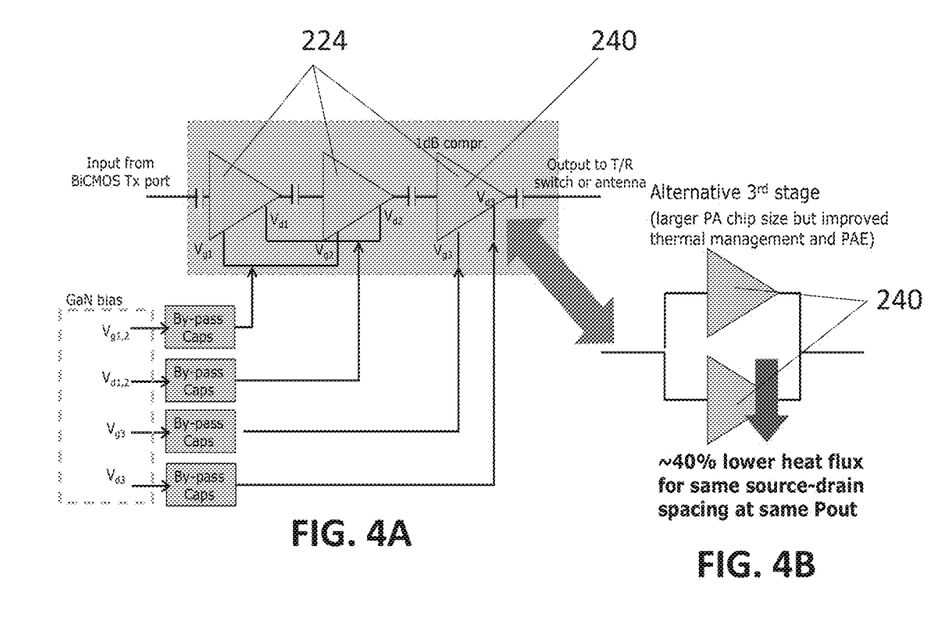
FIGS. 4A and 4B, illustrates a detailed schematic view of a GaN based power amplifier and connections to an integrated control circuit, according to an embodiment.

FIG. 4 depicts a detailed block diagram of the power amplifier 224 of one of the transmit/receive integrated circuits 212. In this embodiment, the power amplifier 224 is configured as a three-stage power amplifier 224. Alternatively, different numbers of stages can be selected depending on the targeted output power and the available input power from the integrated control circuit 202. The third stage can include one active cell as depicted in FIG. 4A, or alternatively can include two split active cells as depicted in FIG. 4B. The split cell topology of FIG. 4B occupies slightly more chip area but offers improved thermal management (approximately 40% lower heat flux for the same source-drain spacing at the same output power) which leads to improved power added efficiency (PAE). Following standard power design techniques, the driving ratio of the power amplifier 224 can be determined by the device sizing depending on the final system requirement, e.g., (PAE and Pout in saturation, at 1 dB compression or at backoff).

Figures 5A, 5B:
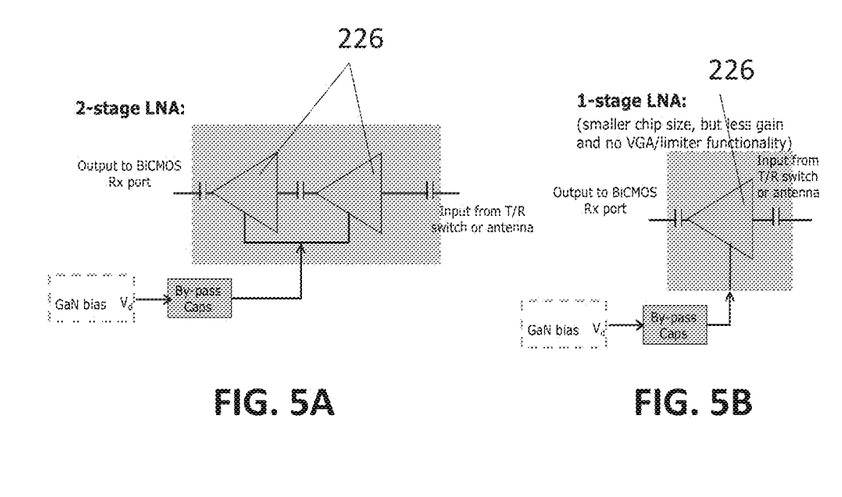
FIGS. 5A and 5B, illustrates a detailed schematic view of a low noise amplifier, according to an embodiment.

FIG. 5, which includes FIG. 5A and FIG. 5B, depicts a detailed block diagram of a low noise amplifier 226 that is provided in the transmit/receive integrated circuit 212. FIG. 5A depicts a two-stage low noise amplifier 226 and FIG. 5B depicts a one-stage low noise amplifier 226. The low noise amplifier 226, in addition to improving reception, is typically required to also provide protection for any transmit/receive system that transmits RF signals at power levels of 36 dBm of or greater. During signal transmission, these high power level signals are present at an input of the transmit/receive switch 238. Although the transmit/receive switch 238 nominally isolates this high power signal from the receive path of the transmit/receive integrated circuit 212, transmit/receive switches typically provide isolation in the range of 20 dB. Therefore, it is possible that an RF signal of 16 dBm or greater can be present in the receive path of the transmit/receive integrated circuit 212. This RF signal can potentially damage the receive circuitry of the integrated control circuit 202. A one-stage or two-stage low noise amplifier 226 provides additional protection by isolating the receive circuity of the integrated control circuit 202 from these potentially damaging signals. The first stage is optimized for minimum noise figure and RF survivability. The second stage, if available, can be used to provide additional gain and as a VGA/limiter for further protecting the integrated control circuit 202.

Figure 6:
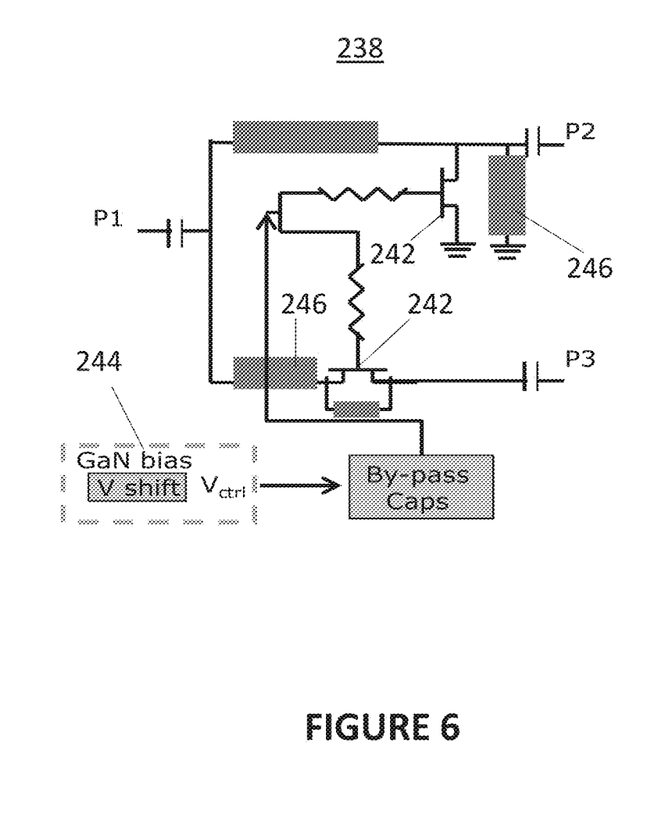
FIG. 6 illustrates a detailed schematic view of a transmit/receive switch for a GaN based transmit/receive integrated circuit, according to an embodiment.

FIG. 6 depicts a detailed schematic of the transmit/receive switch 238 that is provided in the transmit/receive integrated circuit 212. In this embodiment, the transmit/receive switch 238 has an asymmetric topology, which allows the transmitter path to be optimized for linearity and power handling while the receiver path is optimized for low loss. Furthermore, the asymmetric topology requires only one bias control voltage is needed and thus simplifies control of the switch. The switching devices 242 in the transmit/receive switch 238 can be GaN based FET devices, e.g., HEMT devices. As mentioned previously, if the system needs to handle high RF power (e.g., transmit signals of 36 dBm or greater), a high negative control voltage (e.g., −10V to −15V) is needed to control these switching devices 242. If the SiGe BiCMOS technology used for the integrated control circuit 202 is unable to produce these very high negative voltages, an external voltage shifter network 244 can be used. Series inductors 246, e.g., narrow microstrip lines, can be used to tune out the capacitance of the FETs and center the response of the switch (e.g., insertion loss and isolation) at the right frequency of operation. Additional isolation, at the price of higher insertion loss, can be achieved by adding more sections on the switch in a series/shunt topology (not shown in the figure).

Figure 7A:
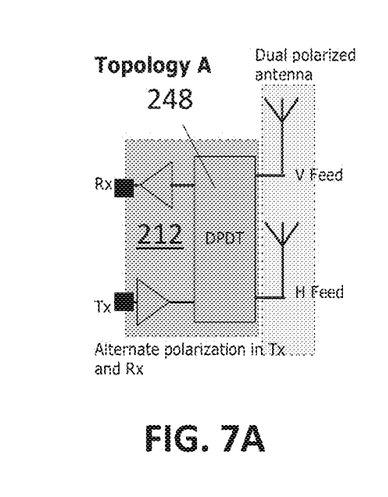
FIGS. 7A and 7B, illustrates a detailed schematic view of dual pole dual throw switch topology and a single pole dual throw switch topology for a GaN based transmit/receive integrated circuit, according to an embodiment.
Figure 7B:
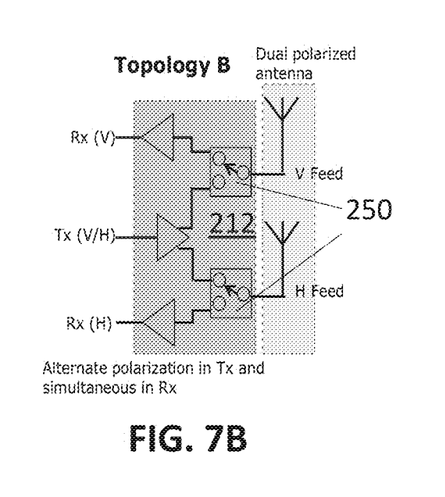

FIG. 7, which includes FIG. 7A and FIG. 7B, depicts a detailed block diagram of the transmit/receive integrated circuit 212 that is configured for a dual polarized antenna system. FIG. 7A depicts a first topology with a double-pole-double-throw (DPDT) switch 248 instead of the transmit/receive switch 238 topology depicted in FIG. 6. A DPDT switch typically has higher loss than a transmit/receive switch, but provides two outputs. These two outputs connect to the two feeds of a dual-polarized antenna. Accordingly, the topology of FIG. 7 can be used for a dual polarized diversity system where the T/R module can transmit and receive in alternate polarizations. FIG. 7B depicts an alternate topology that utilizes two RX chains and two single-pole-double-throw (SPDT) switches 250. This topology offers the option of transmitting in one polarization and simultaneously receiving in the other. Alternatively, another topology (not shown) can have two RX chains and two TX chains with a dual-pole-4-throw (DP4T) switch. This topology can offer simultaneous transmission and reception in both polarizations.

Figure 8:
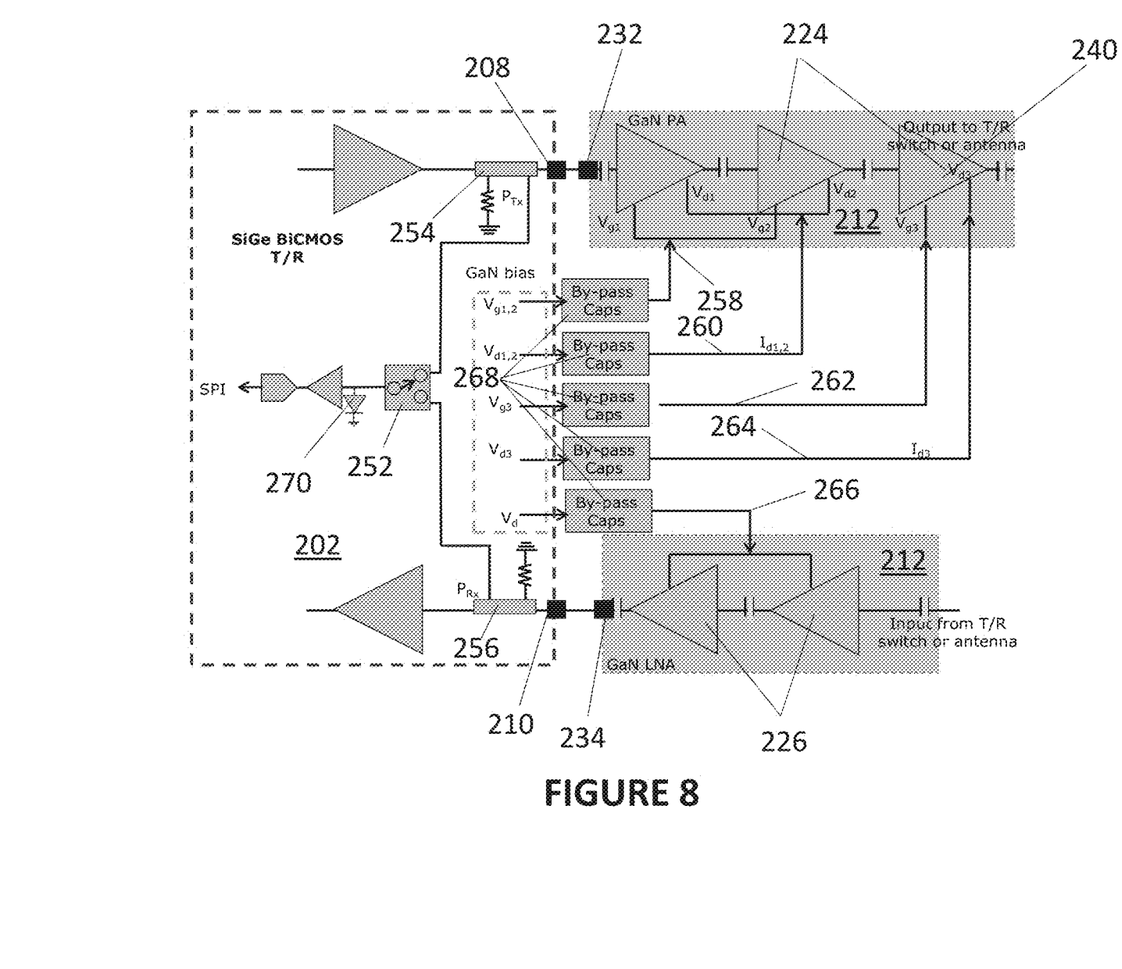
FIG. 8 illustrates a detailed schematic view of transmit/receive circuitry in an integrated control circuit, according to an embodiment.

FIG. 8 depicts a detailed schematic of the interface between the integrated control circuit 202 and the transmit/receive integrated circuit 212. The schematic depicts the transmit channel of the integrated control circuit 202, which feeds the RF transmit signal into a first stage of the power amplifier 224 via the connection between the TX output terminal 208 and the TX input terminal 232, and the receive channel of the integrated control circuit 202, feeds the RF transmit signal from the low noise amplifier 226 to the integrated control circuit 202 via the connection between the RX output terminal 234 and the RX input terminal 210. A single-pole-double-throw (SPDT) switch 252 is used to separate the transmitter from the receiver function.

According to an embodiment, the integrated control circuit 202 includes a TX coupler 254 that is connected to the TX output terminal 208 and thus configured to measure an RF power level of the RF transmit signal that is fed to the transmit/receive integrated circuit 212 by the integrated control circuit 202. The RF power ($P_{TX}$) is measured at the power detector 270. In addition, the integrated control circuit 202 includes an RX coupler 256 that is connected to the RX input terminal and thus configured to measure an RF power level of the RF receive signal that is fed to the integrated control circuit 202 by the transmit/receive integrated circuit 212. The RF power ($P_{RX}$) is measured at the power detector 270. The detector switch 252 is used to connect the power detector 270 to the signal coupled through the Tx coupler 254 or the Rx coupler 256.

In addition to the connection paths between the pairs of I/O terminals 206, the integrated control circuit 202 includes independent electrical connections that enable bias control of the amplifier devices in the transmit/receive integrated circuit 212. This bias control allows the integrated control circuit 202 to (1) set the proper gate bias of the power amplifier 224, (2) calibrate the power level of the amplifier 224 for optimum efficiency, and (3) protect the integrated control circuit 202 from damaging signals in receive mode. The details of these procedures will be described in further detail below. As shown in FIG. 8, the first two stages of the power amplifier 224 have gate and drain bias terminals 258, 260 that are tied together because these stages will both operate in linear mode. The third stage 240 of the power amplifier 224, on the other hand, is required to operate in saturation at power backoff, and more particularly at the 1 dB compression point. Accordingly, an independent connection between the gate and drain bias terminals 262, 264 of the third (final) stage 240 of the power amplifier 224 and the integrated control circuit 202 is provided. The low noise amplifier 226 utilizes a self-bias topology will be used, which sets the gate voltage by using an appropriate resistor connected from the source of the device to ground. Therefore, only a drain voltage, which is provided by a drain connection 266 between the integrated control circuit 202 and the low noise amplifier 226, is needed to turn the device on and off.

A network of by-pass capacitors 268 is provided in the integrated control circuit 202 for each DC bias voltage that is applied to the transmit/receive integrated circuit 212. The network of by-pass capacitors 268 can include a multi-stage network with progressively larger capacitors (starting from 100 pF up to 1 µF, for example) and resistors shunted to ground. This by-pass capacitor network suppresses dc and low frequency oscillations.

Figure 9:
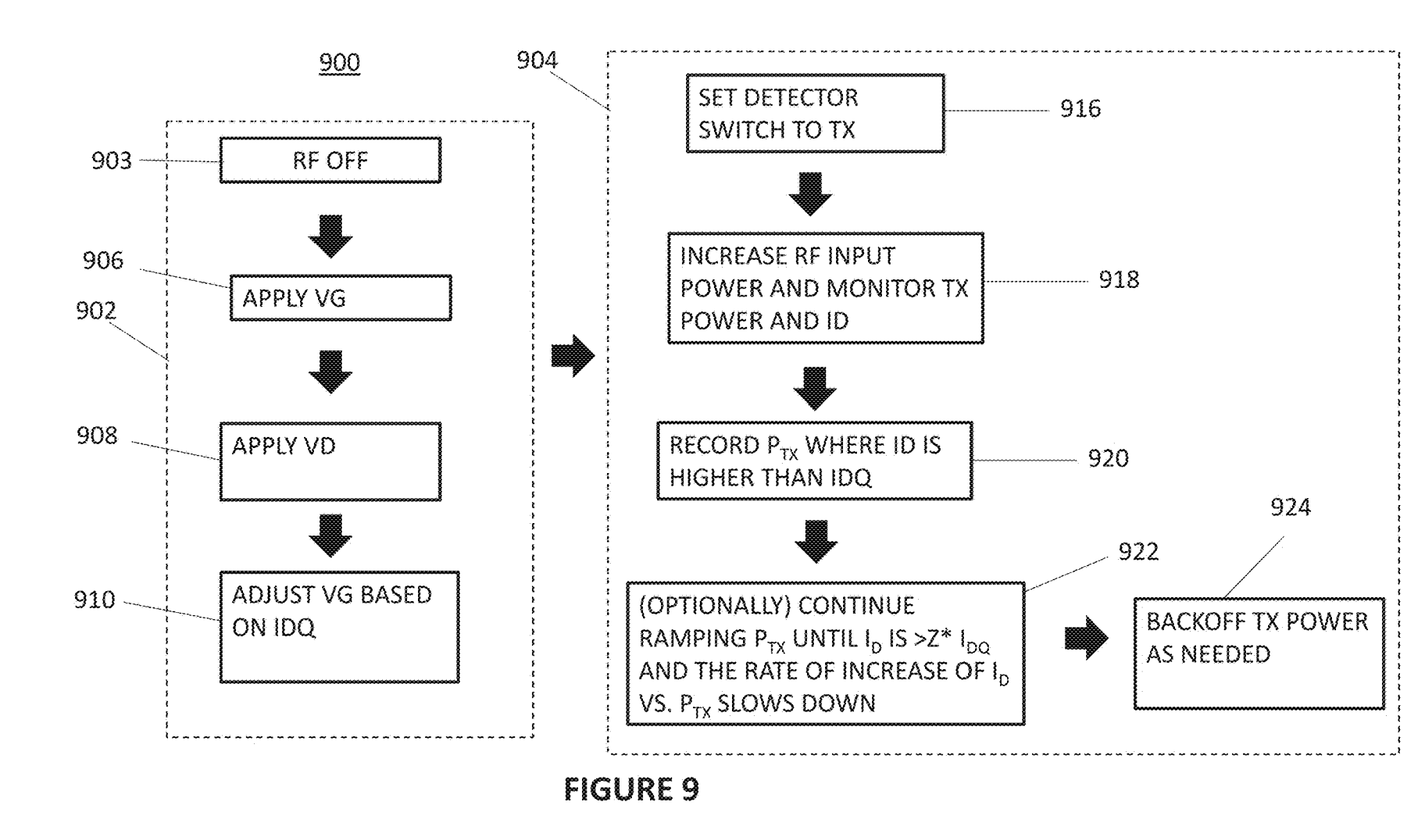
FIG. 9 illustrates a method of operating a transmit/receive module in transmit mode, according to an embodiment.

Referring to FIG. 9, a method 900 of operating the transmit/receive module 200 described herein in transmit mode is depicted, according to an embodiment. The method 900 includes a power amplifier 224 gate biasing (turn-on) technique 902, a power amplifier 224 calibration and operation technique 904.

The power amplifier 224 gate biasing (turn-on) technique 902 begins by turning off 904 (i.e., disabling) the transmission of any RF signal from the integrated control circuit 202 to the transmit/receive integrated circuit 212. Subsequently, a negative gate voltage (VG) is applied 904 to the gate(s) of the power amplifier 224 using the integrated control circuit 202. The gate voltage is sufficient to turn off the gates of the power amplifier 224 (e.g., VG=−5V or less). Subsequently, a drain voltage (VD) is applied 908 to the drain(s) of the power amplifier 224. Subsequently, the gate voltage (VG) is adjusted 910 until the power amplifier 224 exhibits a predetermined quiescent drain current $I_{dq}$. Subsequently, an RF transmit signal is applied to the power amplifier 224. In summary, bias control of the transmit/receive integrated circuit 212 requires the integrated control circuit 202 to provide an initial negative pinch off gate voltage and positive drain voltage, monitor the quiescent drain current $I_{dq}$, and adjust the negative gate voltage so that right quiescent current is maintained.

Figure 10:
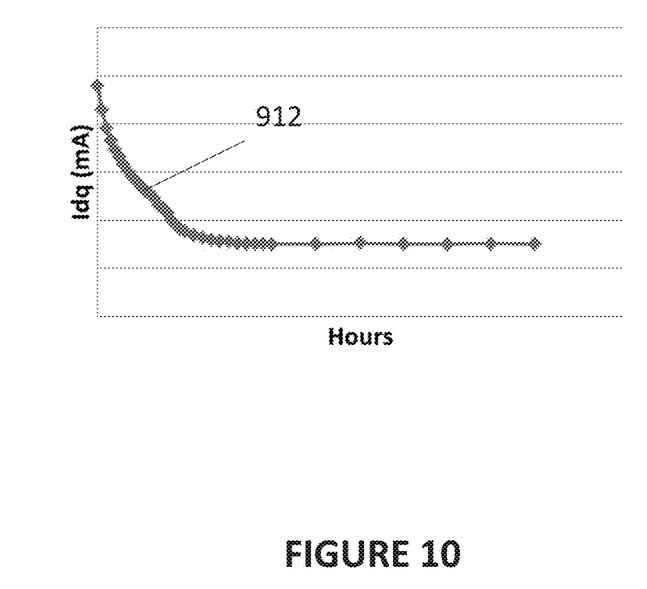
FIG. 10 illustrates a plot of quiescent drain current versus time for a GaN based power amplifier, according to an embodiment.

Referring to FIG. 10, a drift effect for quiescent drain current $I_{dq}$ that occurs in GaN based devices is depicted. The graph depicts quiescent drain current 912 $I_{dq}$ vs. time for the operation of a GaN based transistor. In the initial minutes of operation, quiescent drain current 912 $I_{dq}$ drops rapidly for the first few minutes/hours and eventually stabilizes after multiple hours of continuous operation. By repeatedly performing the gate biasing technique described above throughout the operation of the device, the integrated control circuit 202 can re-bias the device (e.g., shift $V_g$ slightly more positive) to always meet the appropriate quiescent drain current 912 $I_{dq}$ value.

Figure 11:
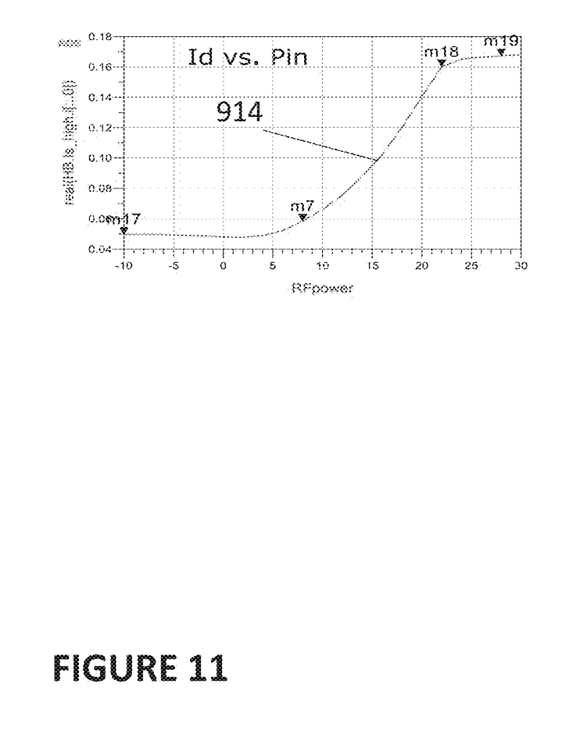
FIG. 11 illustrates a plot of input power versus drain current for a GaN based power amplifier, according to an embodiment.

Referring to FIG. 11, an example of the simulated performance of a single stage 17-19 GHz GaN based amplifier is depicted. This GaN based amplifier can be the final stage of the power amplifier 224 of the transmit/receive integrated circuit 212 described herein. As can be seen from the plot 914 of drain current vs. input power, drain current remains at or below quiescent drain current $I_{dq}$ of 50 mA when the power amplifier 224 is in the linear mode. At 1 dB compression point ($P_{in}$=8 dBm) the drain current is 58 mA (15% higher than $I_{dq}$), at maximum power added efficiency ($P_{in}$=22 dBm) the drain current is 160 mA (3.2×$I_{dq}$) and at $P_{sat}$ (saturation) the drain current is 167 mA (3.3×$I_{dq}$). Also, as the amplifier approaches $P_{sat}$, the change in drain current versus input power is very small (5% for each dB of increasing input power). These relationships demonstrate that the $P_{out}$ and linearity (level of compression) of the GaN based amplifier can be monitored by tracking the input power $P_{in}$ and the drain current of the power amplifier 224. In this example, 1 dB compression occurs when $I_d$~1.15×$I_{dq}$ and $P_{sat}$ is reached once $I_d$ exceeds 3×$I_{dq}$ and the rate of change of $I_d$ vs. $P_{in}$ is <5% per 1 dB of increasing input power. These exact values refer to a specific GaN device, but these relationships can be extrapolated for other mmW GaN technologies.

By utilizing the stored plot 914 of drain current vs. input power, the integrated control circuit 202 can perform the power amplifier 224 calibration technique. Referring again to FIG. 9, the power amplifier 224 calibration technique 904 can be performed after the power amplifier 224 gate biasing technique 902. Once the power amplifier 224 is biased, the switch 252 connects the power sensor 270 to the Tx power through the TX coupler 254 and the transmit power of the RF transmit signal is measured. The RF signal is fed to the power amplifier 224 and the $P_{Tx}$ (transmit power) slowly ramps while the drain current of the power amplifier 224 is monitored 918 using the independent connections of the integrated control circuit 202. The integrated control circuit 202 records $P_{Tx}$ which results $I_d$ that is X % higher than the $I_{dq}$ 920. In the example described with reference to FIG. 10, x=15%. However, this is one example and the exact value of X can be determined with experimental data for each power amplifier 224. This process allows the integrated control circuit 202 to estimate the necessary gate and drain currents to operate at the 1 dB compression point, and backoff the input power to the necessary value depending on the modulation and coding scheme (MCS). Optionally, the $P_{Tx}$ can be further increased until $I_d$ is >z*$I_{dq}$ and the rate of increase of $I_d$ vs. $P_{Tx}$ slows down 922 (e.g., <y % per dB of increased input power). In the example shown above that would be z=3.3 and y=5% increase in $I_{dq}$ for 1 dB increase of $P_{Tx}$). The exact values of z and y % can be determined by experimental data for any power amplifier 224 device. This calibration process can be repeated periodically as needed 924 to account for any drift and temperature effects on the power amplifier 224. Once the PA is calibrated, the transmitter can start sending packets at the maximum power possible for each MCS specified on the preamble of each packet.

Figure 12:
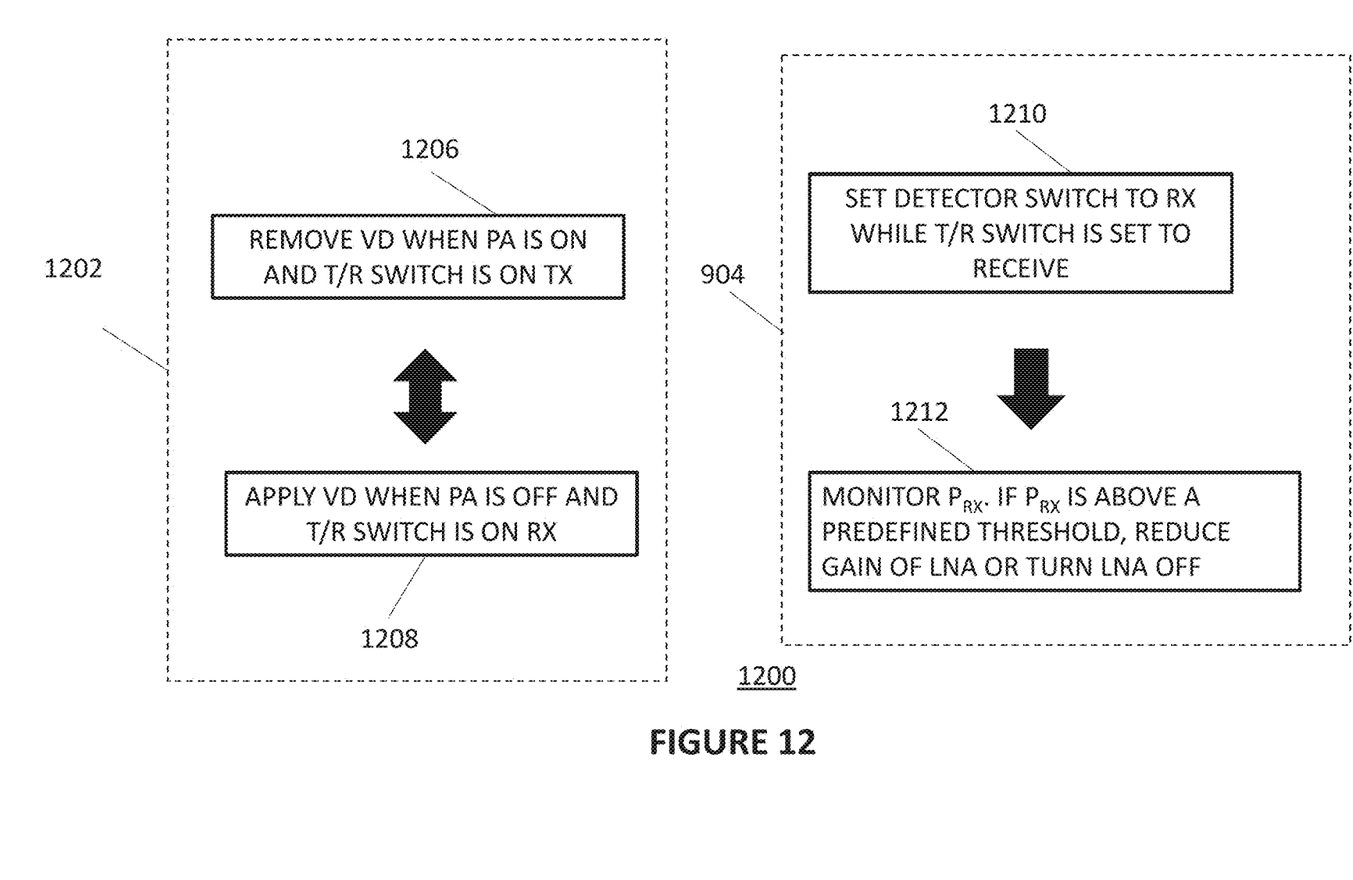
FIG. 12 illustrates a method of operating a transmit/receive module in receive mode, according to an embodiment.

Referring to FIG. 12, a method 1200 of operating the transmit/receive module 200 described herein in receive mode is depicted, according to an embodiment. The method include a receive mode initialization process 1202 and an RX power protection process 1204. According to the receive mode initialization process 1202, prior to entering receive mode, $V_D$ (drain voltage to the low noise amplifier 226) is removed 1206 when the power amplifier 224 is on. Subsequently, the transmit/receive switch 238 is switched to the receive mode 1208 so that the antenna element is connected to the low noise amplifier 226. Subsequently, $V_D$ is applied 1208 and the transmit/receive integrated circuit 1212 is now operating in receive mode.

During the receive mode, the transmit/receive switch 238 of the low noise amplifier 226 is on and is forwarding the RF receive signal, the integrated control circuit 202 is exposed to potentially damaging high power signals. These high power signals can be generated by adjacent transmitters or by multi-path reflections of the transmitted signal coming back in the antenna at some random time interval after it was transmitted. In any case, these signals have the potential to damage the receive circuitry of the integrated control circuit 202. According to the RX power protection process 1204 disclosed herein, when transmit/receive switch 238 is set to receive, the detection switch 252 is set as the power detector 270 is connected to the RX power through the RX coupler 256. Subsequently, the power level of the RF receives signal ($P_{Rx}$) is tracked. If the $P_{Rx}$ is higher than a pre-defined limit (defined by the power handling capability of the BiCMOS technology used), the low noise amplifier 226 gain is reduced 1212 by reducing $V_d$. Alternatively, the low noise amplifier 226 can be turned off 1212. Because the low noise amplifier 226 described herein uses a self-bias topology, gate bias is automatically set by $V_d$ and therefore $V_d$ only needs to be adjusted to control the low noise amplifier 226.

The transmit/receive module 200 and corresponding techniques described herein advantageously use power sensors that are incorporated into the integrated control circuit 202 to perform the gate biasing and power calibration techniques described herein. Conventional GaN based power amplifier designs utilize power sensors that are incorporated into the GaN chip itself. While this configuration allows for calibration based upon absolute transmitted power, this has limited use for mmW communication systems that operate at back-off levels from the output. In that case, the backoff is pre-determined depending on which modulation and coding scheme (MCS) is used. The $P_{in}$ vs. $I_d$ measurement described herein allows the integrated control circuit 202 to identify the 1 dB compression point and $P_{sat}$ and then backoff the input power in the power amplifier 224 from that point depending on the MCS used. This calibration will allow the transmitter to operate at the highest power which meets the spectral mask and error vector magnitude (EVM) requirements for the selected MCS. Furthermore, the output power can be potentially monitored for each transmitted packet and adjusted depending on the MCS information that is included in the preamble short training field.

Another drawback of conventional GaN based power amplifier designs that utilize power sensors that are incorporated into the GaN chip is that the power sensors utilize valuable space on the GaN chip. Typically, a power detector uses a coupler that taps the output port and couples a small fraction of the $P_{out}$ in the detector and a diode detector. The coupler occupies space on the GaN chip in the form of coupler transmission lines, thin film resistor, and via-to-ground structures, for example. The detector diode can be monolithically integrated on the GaN chip (FET connected as diode) or it can be on a different chip. In the first case the diode occupies space on the GaN chip (FET, via-to-ground).

In the second case, the diode requires an extra input/output pad specifically for the power detection circuit, which also occupies extra space on the chip. This increase in size is particularly problematic in the case of 5G mmW phased antenna array systems that require very compact size to accommodate the spacing requirements of the antenna elements.

As employed in this specification, the terms "coupled" and/or "electrically coupled" are not meant to mean that the elements must be directly coupled together—intervening elements may be provided between the "coupled" or "electrically coupled" elements. The term "electrically connected" intends to describe a low-ohmic electric connection between the elements electrically connected together, e.g., a connection via a metal and/or highly doped semiconductor.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A transmit/receive module, comprising:
   an integrated control circuit, comprising: an RFIC input terminal; multiple pairs of I/O terminals, each pair comprising a TX output terminal and an RX input terminal; a power splitter/combiner having an input connected to the RFIC input terminal; a plurality of phase shifters connected between outputs of the power splitter/combiner and the I/O terminals; and a power sensor connected to each one of the I/O terminals;
   a plurality of transmit/receive integrated circuits connected to the integrated control circuit, each of the transmit/receive integrated circuits comprising: a TX input terminal connected to the TX output terminal of one of the pairs of I/O terminals; an RX output terminal connected to the RX input terminal from the one of the pairs of I/O terminals; an antenna interface terminal; a power amplifier connected to the TX input terminal; a low noise amplifier connected to the RX output terminal; and a switch connected between the power amplifier, the low noise amplifier and the antenna interface terminal,
   wherein gate and drain terminals of a final stage of each power amplifier of the transmit/receive integrated circuits are independently connected to and controllable by the integrated control circuit.

2. The transmit/receive module of claim 1, wherein the integrated control circuit is a SiGe BiCMOS integrated circuit, and wherein each of the transmit/receive integrated circuits are GaN based integrated circuits.

3. The transmit/receive module of claim 1, wherein the switch of each integrated control circuit is a double-pole-double-throw switch.

4. The transmit/receive module of claim 1, wherein the switch of each integrated control circuit is a single-pole-double-throw switch.

* * * * *